United States Patent
St. Jacques, Jr. et al.

(10) Patent No.: US 8,502,996 B2
(45) Date of Patent: Aug. 6, 2013

(54) METHOD AND SYSTEM FOR MATCHING DISTRIBUTED USERS WITH DISTRIBUTED MULTI-FUNCTION DEVICES

(75) Inventors: Robert J. St. Jacques, Jr., Fairport, NY (US); Hua Liu, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1000 days.

(21) Appl. No.: 12/557,166

(22) Filed: Sep. 10, 2009

(65) Prior Publication Data

US 2011/0058202 A1    Mar. 10, 2011

(51) Int. Cl.
*G06F 3/12* (2006.01)
(52) U.S. Cl.
USPC .......................................... 358/1.13; 358/1.1
(58) Field of Classification Search
USPC ........................................ 358/1.1, 1.13, 1.15
See application file for complete search history.

(56) References Cited

U.S. PATENT DOCUMENTS

| | | | |
|---|---|---|---|
| 5,920,405 A | 7/1999 | McIntyre et al. | 358/442 |
| 7,099,021 B2 | 8/2006 | Oyanagi | 358/1.13 |
| 7,433,932 B2 | 10/2008 | Eifler et al. | 709/217 |
| 7,474,428 B2 | 1/2009 | Morris-Jones et al. | 358/1.15 |
| 7,525,676 B2 | 4/2009 | Pesar | 358/1.13 |
| 2004/0162076 A1* | 8/2004 | Chowdry et al. | 455/445 |
| 2004/0196491 A1* | 10/2004 | Uchino | 358/1.15 |
| 2010/0039662 A1* | 2/2010 | Reddy et al. | 358/1.15 |

* cited by examiner

*Primary Examiner* — King Poon
*Assistant Examiner* — Iriana Cruz
(74) *Attorney, Agent, or Firm* — Kermit D. Lopez; Luis M. Ortiz; Kevin Soules

(57) ABSTRACT

A method and system for matching distributed users with distributed MFDs is disclosed, which incorporates a MFD cloud, a back end unit, and a client application. The MFD cloud is composed of a large number of geographically distributed MFDs and can be logically divided into a public cloud and a private cloud. The back end unit maintains a persistent state of each MFD associated with the MFD cloud. The client application permits the distributed users to submit a rendering job in association with a job criterion to the back end unit which responds with a sorted list of nearby available MFDs that meet the job criterion. The user can select a MFD from the list and turn-by-turn directions from a user's current location to the selected MFD can be provided for collecting the rendering job. The system data can be kept current by periodically sending a status associated with each MFD.

19 Claims, 5 Drawing Sheets

METHOD AND SYSTEM FOR MATCHING DISTRIBUTED USERS WITH DISTRIBUTED MULTI-FUNCTION DEVICES

TECHNICAL FIELD

Embodiments are generally related to multi-function devices such as printers, scanners, photocopy machines, and the like. Embodiments are also related to telecommunications systems and techniques. Embodiments are additionally related to methods for matching distributed users with distributed multi-function devices.

BACKGROUND OF THE INVENTION

Networked multi-function devices (MFD) generally interact with an assemblage of varying rendering devices, client computers, servers, and other components that are connected to and communicate over a network. A typical MFD may be configured as a rendering device having combined printing, scanning, faxing, and/or photocopying capabilities.

MFDs are utilized in a wide variety of environments such as, for example, drug stores, libraries, computer labs and so forth. It is desirable to locate and check availability of the distributed MFDs in order to render documents from different locations with cost effective solutions. Presently, an enormous amount of time, money, and effort is being expended by companies to provide product related information after a product purchase has taken place.

For decades, various types of media have been utilized to realize such fundamental business functions. In conventional document rendering systems, a user must have knowledge a priori regarding location, capability, and availability of the MFDs to render a specific job or a document. Once a suitable location has been found, the users will tend to frequent that location regardless of the MFD capability, availability, or convenience. Consequently, due to lack of knowledge with respect to the target MFD, an opportunity is lost to render the jobs at more suitable MFD that are installed closer to the user or co-located with other tasks that the user may perform such as getting coffee or running errands. Additionally, in environments where the MFD is in an open public area such as, for example, a coffee shop or a grocery store, there is a real possibility that the rendering job might be stolen, discarded, or otherwise lost before the user arrives at the MFD location.

Based on the foregoing, it is believed that a need exists for an improved method and system for matching distributed users with distributed MFDs. A need also exists for providing rendering job security with respect to distributed MFDs, as described in greater detail herein.

BRIEF SUMMARY

The following summary is provided to facilitate an understanding of some of the innovative features unique to the present invention and is not intended to be a full description. A full appreciation of the various aspects of the embodiments disclosed herein can be gained by taking the entire specification, claims, drawings, and abstract as a whole.

It is, therefore, one aspect of the present invention to provide for an improved method and system for configuring a multi-function device (MFD) such as a printer, scanner, photocopy machine, fax machine, or a combination thereof.

It is another aspect of the present invention to provide for a method and system for matching distributed users with distributed MFDs.

It is a further aspect of the present invention to provide for an improved method for providing rendering job security with respect to distributed MFDs.

It is yet a further aspect of the present invention to provide for an improved method and system for maintaining a list of MFDs in association with their key attributes to best match a document processing requirement.

The aforementioned aspects and other objectives and advantages can now be achieved as described herein. A method and system for matching distributed users with distributed MFDs is disclosed, which incorporates an MFD cloud, a back end unit, and a client application. The MFD cloud is composed of a large number of geographically distributed MFDs and can be logically divided into a public cloud and a private cloud. The back end unit maintains a persistent state of each MFD associated with the MFD cloud. The client application permits the distributed users to submit a rendering job in association with a job criterion to the back end unit which responds with a sorted list of nearby available MFDs that meet the job criterion. The user can select a MFD from the list and turn-by-turn directions from a user's current location to the selected MFD can be provided for collecting the rendering job. The system data can be kept current by periodically sending a status associated with each MFD. Note that the aforementioned "back end unit" is intended to be part of the "public cloud." That is to say that it is not necessarily a dedicated computer and the process may be running on any part of the cloud at any time. The "queue" at the back end is likewise intended to be cloud-based storage (e.g. distributed storage).

The public cloud includes publicly accessible MFDs and the private cloud includes privately owned and/or operated MFDs, which can be accessible to a subset of users. The MFD cloud transmits a heartbeat to the back end unit which provides a snapshot of the MFD's current availability and verifies that the MFD is still powered up and connected to the MFD cloud. The back end unit can provide a single point of access for the MFD cloud and the users. Each MFD within the cloud can be registered in association with the back end unit. The registration can include location information and the basic capabilities of the MFD and account information with respect to the owner of the MFD in order to handle billing in association with the MFD.

Each user can be registered with the back end unit and possess a virtual print queue that contains the job(s) submitted for rendering. The queue can be created utilizing distributed storage in the private cloud and/or a storage space in the back end unit. The job criterion describes how the output must be handled (e.g. color, double sided, collated, stapled, multiple copies, and A4 paper) and the user's current location. The current location may be configured within a stationary client or gleaned from a GPS capable mobile device.

The rendering job can also be flagged as "confidential" and the job can be stored within the virtual print queue in the private MFD cloud and can only be rendered on the MFDs within the private cloud. The jobs can also be stored in the back end unit and can be pulled down by the MFDs in either the public or private cloud. Once arrived at the destination MFD, the user accesses a MFD matchmaking service via the MFD local user interface and authenticates. The MFD queries the back end unit for a list of jobs belonging to the user including criterion that match the MFDs capabilities. The user selects the job(s) from the list and the MFD sends a print indication to the back end unit. The back end unit transmits the print-ready jobs to the MFD. Note that the MFD may also "pull" the jobs to itself, particularly in cases where the jobs are stored in distributed storage within the MFD cloud (i.e., as opposed to having the jobs "pushed" by the back end unit). Upon successful completion of the rendering jobs, the MFD sends notification to the back end unit for billing purposes.

An EIP (Extensible Interface Platform) enabled MFD can be seamlessly integrated with the back end unit. The EIP enabled MFD can send user information to the back end unit and retrieve the user's document locally for rendering via EIP applications. A picture of a two dimensional code can be glued to a non-EIP enabled MFD. The picture associated with the code can be sent to the back end unit if a user needs to render a document on the non-EIP enabled MFD. The code can be interpreted by the system to find the identifying information (including IP address and hostname) associated with the MFD and the user's document can be retrieved and rendered to the IP address.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The disclosed method and system matches distributed users with distributed MFDs based on document processing requirements and facilitates the selection of an optimal product within a particular region. Location information concerning the MFD can be traced via an associated GPS module, which is discussed in greater detail herein. Various computing environments can incorporate capabilities for supporting users accessing networks on which MFDs reside. The following discussion is intended to provide a brief, general description of suitable computing environments in which the method and system may be implemented. Although not required, the method and system will be described in the general context of computer-executable instructions, such as program modules, being executed by a single computer.

Generally, program "modules" include routines, programs, objects, components, data structures, etc., that perform particular tasks or implement particular abstract data types. Moreover, those skilled in the art will appreciate that the method and system may be practiced with other computer system configurations including hand-held devices, multi-processor systems, microprocessor-based, or programmable consumer electronics, networked PCs, minicomputers, mainframe computers, and the like.

Figure 1:
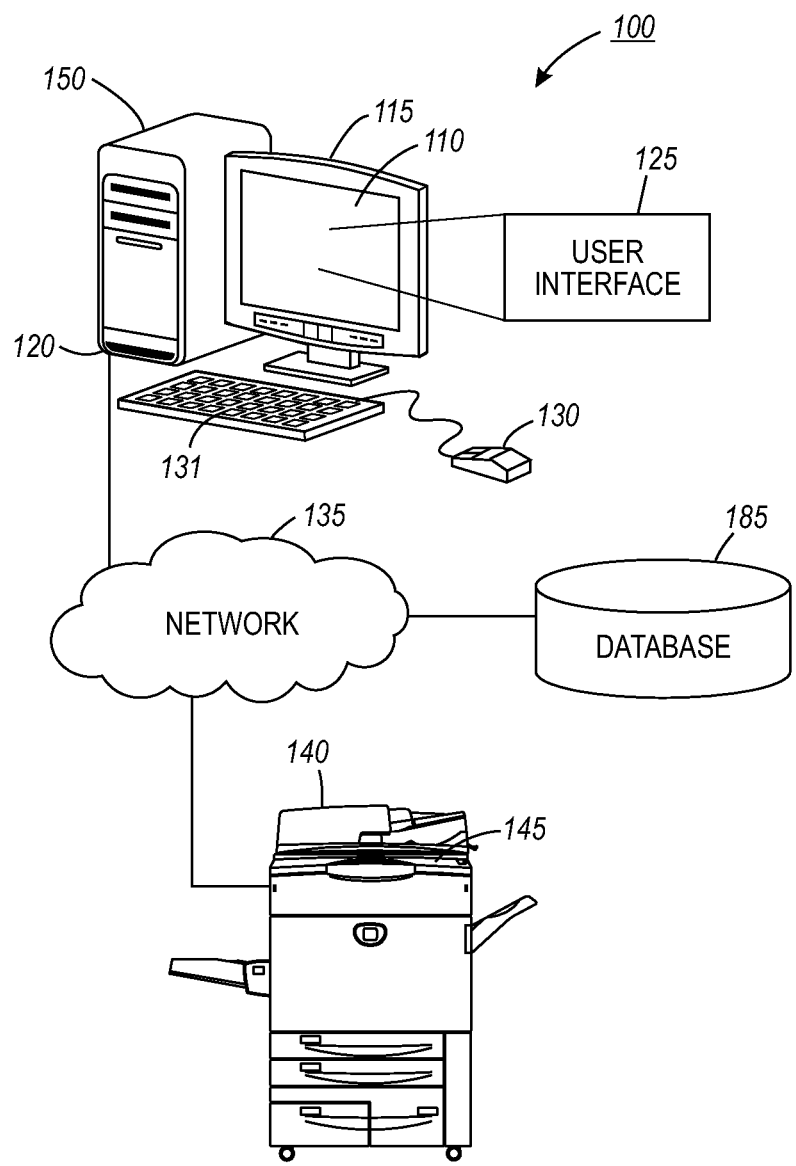
FIG. 1 illustrates an example of an MFD coupled to a data-processing apparatus through a network, in accordance with an embodiment.

FIG. 1 is provided as an exemplary diagram of data processing environments in which embodiments of the present invention may be implemented. It should be appreciated that FIG. 1 is only exemplary and is not intended to assert or imply any limitation with regard to the environments in which aspects or embodiments of the present invention may be implemented. Many modifications to the depicted environments may be made without departing from the spirit and scope of the present invention.

Referring to FIG. 1, system 100 includes a MFD 140 coupled to a data-processing apparatus 110 through a network 135. The data-processing apparatus 110 can be, for example, a personal computer or other computing device and can generally includes a central processor 120, a display device 115, a keyboard 131, and a pointing device 130 (e.g., mouse, track ball, pen device, or the like). Additional input/output devices, such as the MFD 140, may be included in association with the data-processing apparatus 110 as desired.

Note that as utilized herein, the term multi-function device (including the acronym MFD) may refer to an apparatus or system such as a printer, scanner, fax machine, copy machine, etc., and/or a combination thereof. Preferably, MFD 140 is capable of multiple rendering functions such as printing, copying, scanning, faxing, etc. In some embodiments, MFD 140 may be implemented with a single rendering function such as printing. In other embodiments, MFD 140 can be configured to provide multiple rendering functions such as scanning, faxing, printing, and copying and can be connected to a network. Note that the MFDs 201-205 described in greater detail herein are analogous or similar to MFD 140.

The data-processing apparatus 110 can be coupled to the MFD 140 through a computer network 135. Network 135 may employ any network topology, transmission medium, or network protocol such as, for example, a computer network, Ethernet, Internet, Intranet, etc. Network 135 may include connections such as wire, wireless communication links, or fiber optic cables. The data-processing apparatus 110 includes a GUI 125 that displays information and receives data through device display and/or the keyboard/mouse combination. The GUI 125 also serves to display results, whereupon the user may supply additional inputs or terminate a given session. The data-processing apparatus 110 can be, for example, any computing device capable of being integrated within a network such as a PDA, personal computer, cellular telephone, point-of-sale terminal, server, etc. Note also that in FIGS. 1-5 herein, identical or similar parts or elements are generally indicated by identical reference numerals.

A MFD driver program can be installed on the data-processing apparatus 110 and can reside on the host device's hard drive 150. The MFD driver program may be activated through an application interface so that a user may generate a rendering job with the MFD driver for processing by the MFD 140. The MFD 140 also includes a GUI 145 for communicating MFD features for processing, for example, a rendering job to a user and accepting the user's selection of available MFD features. The user interface 145 displays information and receives data through the device display and can be manipulated by a user interface including touch sensitive screen, buttons, and/or the keyboard/mouse combination. The GUI 145 associated with the rendering device 140 can include, for example, a graphically displayed panel menu that provides various input and selection features to enter data into the rendering device 140. A user profile, work product for rendering, media library, rendering job parameters, and so forth can be stored in database 185, which is accessible by the data-processing apparatus 110 or rendering device 140 via the network 135, or can be directly accessed via the rendering device 140.

The following description is presented with respect to embodiments of the present invention, which can be embodied in the context of a data-processing apparatus 110 and MFD 140 depicted in FIG. 1. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms including Macintosh, UNIX, LINUX, and the like. Therefore, the description of the exemplary embodiments, which follows, is for purposes of illustration and not considered a limitation.

Figure 2:
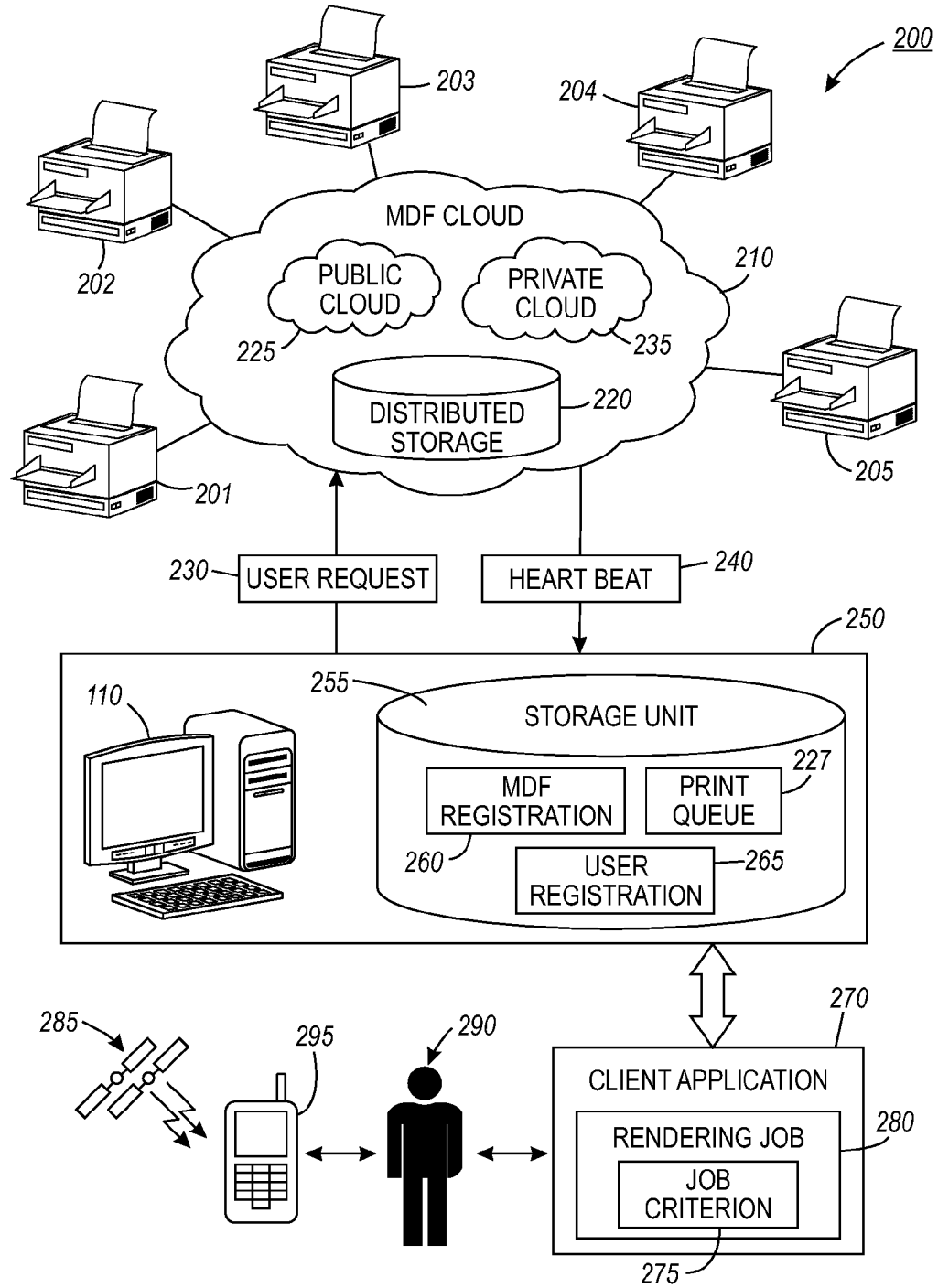
FIG. 2 illustrates a block diagram of a system for matching distributed users with distributed MFDs, in accordance with an embodiment.

FIG. 2 illustrates a block diagram of a system 200 for matching distributed users with distributed MFDs, in accordance with an embodiment. The system 200 generally includes a MFD cloud 210 associated with one or more multi-function devices 201, 202, 203, 204 and 205, a back end unit 250, and a client application 270. The "back end unit" 250 may be, for example, personal computers or network computers. Data-processing system 110 depicted in FIG. 1 can be, for example, a back end unit. The client application 270 can also be a data processing system such as personal computers, mobile phones, hand held devices, and the like. The multi-function devices 201-205 can be located remotely with respect to each other, or alternatively, they may be located locally with respect to each other such as, for example, at a print shop or in an office environment.

The MFD cloud 210 can be logically divided into a public cloud 225 and a private cloud 235. The public cloud 225 includes publicly accessible MFDs 201, 202 and 203 located in environments such as print shops, coffee shops, FedEx offices, public libraries, universities, banks, and the like. The private cloud 235 includes privately owned and/or operated MFDs 204 and 205 that are only accessible to a subset of users such as, for example, MFDs within an enterprise or a small business. The MFDs in the public cloud 225 and the private cloud 235 both require internet access either directly or through a proxy to access the system 200.

The MFD is an office machine which incorporates the functionality of multiple devices in one so as to provide centralized document management, document distribution, and production in a large-office setting and the like. The typical MFD may act as a combination of a printer, scanner, photocopier, fax, and e-mail. While five multi-function devices 201-205 are shown by way of example, it is to be appreciated that any number of rendering devices may be linked to the MFD cloud 210 such as two, four, six or more rendering devices. In general, the multi-function devices 201-205 can be utilized to perform a rendering output function (e.g., printing, scanning, copying, faxing, etc.) within a networked environment. Note that multi-function devices 201-205 are generally analogous to one another.

The MFD cloud 210 can be provided as a module (e.g., software module) or a group of such modules. Note that as utilized herein, the term "module" may refer to a physical hardware component and/or to a software module. In the computer programming arts, such a software "module" may be implemented as a collection of routines and data structures that performs particular tasks or implements a particular abstract data type. Modules of this type are generally composed of two parts. First, a software module may list the constants, data types, variable, routines, and so forth that can be accessed by other modules or routines. Second, a software module may be configured as an implementation, which can be private (i.e., accessible only to the module) and which contains the source code that actually implements the routines or subroutines upon which the module is based.

Therefore, when referring to a "module" herein, the inventors are generally referring to such software modules or implementations thereof. The methodology described herein can be implemented as a series of such modules or as a single software module. Such modules can be utilized separately or together to form a program product that can be implemented through signal-bearing media including transmission media and recordable media. The present invention is capable of being distributed as a program product in a variety of forms, which apply equally regardless of the particular type of signal-bearing media utilized to carry out the distribution.

Examples of signal-bearing media can include, for example, recordable-type media such as floppy disks, hard disk drives, CD ROMs, CD-Rs, etc., and transmission media such as digital and/or analog communication links. Examples of transmission media can also include devices such as modems, which permit information to be transmitted over standard telephone lines and/or the more advanced digital communications lines.

The back end unit 250 can be implemented in a number of ways, but is logically a server that provides a single point of access for a user 290 and the MFD cloud 210. Note that the back end unit 250 can be provided as a module (e.g., software module) or a group of such modules. Each MFD 201-205 within the MFD cloud 210 can be registered in association with the back end unit 250. The registration 260 can include location of the MFDs 201-205 such as GPS coordinates and the basic capabilities of the MFDs 201-205 including, but not limited to, color capability, supported paper sizes, single/double sided printing, etc. The registration can include account information associated with an owner of the MFDs 201-205 so that billing can be handled when the user 290 render jobs to the MFDs 201-205.

Additionally, each MFD 201-205 associated with the cloud 210 transmits a "heartbeat" 240 to the back end unit 250. The "heartbeat" 240 provides a snapshot of the MFDs 201-205 current availability (e.g., up, down, jammed, out of toner, out of paper, etc) and verifies that the MFDs 201-205 are still powered up and connected to the cloud 210 (i.e. that it can receive jobs from the back end unit 250). The "heartbeat" 240 can be small and regular (e.g. every 5 minutes) to insure that any problems preventing the MFDs 201-205 from fulfilling user needs and can be detected quickly, but without requiring excessively frequent communication between the individual MFDs and the back end unit.

A user registration 265 can also be performed in association with the back end unit 250. The client application 270 permits roaming and/or distributed user 290 to submit a rendering job (e.g., print job) 280 in association with a job criterion 275 to the back end unit 250. Note that the client application 270 can be provided as a module (e.g., software module) or a group of such modules. The users may be independent or they may be associated with one or more larger accounts which can be utilized to access the MFD 204 and 205 within the private cloud 235. For example, a corporate user can be able to access any MFD 201, 202 and 203 in the public cloud 225, but can also be able to submit jobs and be routed to any MFDs within the enterprise that are registered with the system 250. The user registration 265 can also include billing information so that any prints ordered by the user can be billed appropriately.

Each user possesses a virtual print queue 227 that includes the job 280 submitted for rendering. The queue 227 can be created utilizing a distributed storage 220 in the private cloud 235 or a storage unit 255 in the back end unit 250. Note that this is intended to be distributed storage in the public cloud. The entire "back end unit" is intended to be a software process running in the public cloud (though a hosted option with dedicated storage is also possible).

The jobs 280 can be submitted in a universal print ready format (e.g. PDF) or in a native application format (e.g. Microsoft Word, OpenOffice, PhotoShop, etc.). Each job 280 submitted can include the job criterion 275 describing how the output can be handled (e.g. color, double sided, collated, stapled, multiple copies, and A4 paper) and the user's current location. The current location may be configured within a stationary client or gleaned from a mobile device 295 associated with a GPS module 285. The wireless mobile device 295 may be a wireless device such as, for example, a Smartphone, a wireless personal digital assistant (PDA), or the like.

The rendering job 280 can also be flagged as "confidential". Confidential jobs can be stored within the virtual print queue 227 in the private MFD cloud 235 and can be rendered on the MFDs 204 and 205 associated with the private cloud 235. The jobs 280 can also be stored in the back end unit 250 and may be pulled down by the MFDs 201-205 in either the public or private cloud 225 and 235. Note that only jobs not marked as confidential are stored in the public cloud. Confidential jobs never leave the private cloud (e.g. the enterprise network).

After the user 290 submitted the job data 280 and criterion 275, the back end unit 250 responds with a sorted list of available MFDs closer to the user that meet the user's criterion 275. The available MFDs include those that meet the job requirements and for which the latest "heartbeat" received indicates that the MFD is connected and functioning properly. The list may be sorted in any number of ways including, but not limited to, nearest first, preferred customers first, newest first, promotional offers (e.g. free cup of coffee with your print), based on user preferences or usage patterns and cost (cheapest for the user or largest profit margin for the vendor).

The user 290 can select one of the suggested MFDs or refine the criterion and resubmit the job. Once the user 290 has chosen a MFD, the back end unit 250 provides turn-by-turn directions from the user's current location (submitted as part of the job) to the location of the chosen MFD utilizing the GPS module 285. The GPS module 285 can generate a driving direction feature for the user selected MFD location which guides the user towards the device location in an optimal way. The GPS module 285 can be utilized to compare the current location of the mobile device 295 to the closest location of the MFD that meets the applied criterion 275, in response to a request via the mobile device 295. Additionally, the user 290 may specify other criterion such as a route on which the user plans to travel or details about preferred locations.

The system 250 can immediately notify the user if the user selectable MFD becomes unavailable (e.g. loses connectivity and misses a heartbeat, runs out of toner, etc.). The system 250 can also offer to reroute to the next nearest MFD that satisfies the user's criterion 275 or allow the user 290 to resubmit the job 280 and search again utilizing the user's latest location information. The user 290 accesses the MFD matchmaking service and authenticates once the user 290 arrived at the destination MFD. For example, the user waves an RFID enabled employee ID near a sensor on the MFD, or logs in with a username and PIN.

The MFD queries the back end unit 250 for a list of jobs belonging to the user 290 including criterion that match the MFDs capabilities. The user selects the job(s) from the list and the MFD sends the print indication to the back end unit 250. The back end unit 250 translates any documents not already in a print ready format into a format (e.g. by using the Nuance universal translation service) and transmits the print-ready jobs to the MFD. Such an approach can be done utilizing "print by reference" (i.e. sending a job containing a URL pointer to the print ready document which the MFD then utilizes to pull the document down for rendering). Upon successful completion of the rendering jobs, the MFD sends notification to the back end unit 250 for billing purposes.

Figure 3:
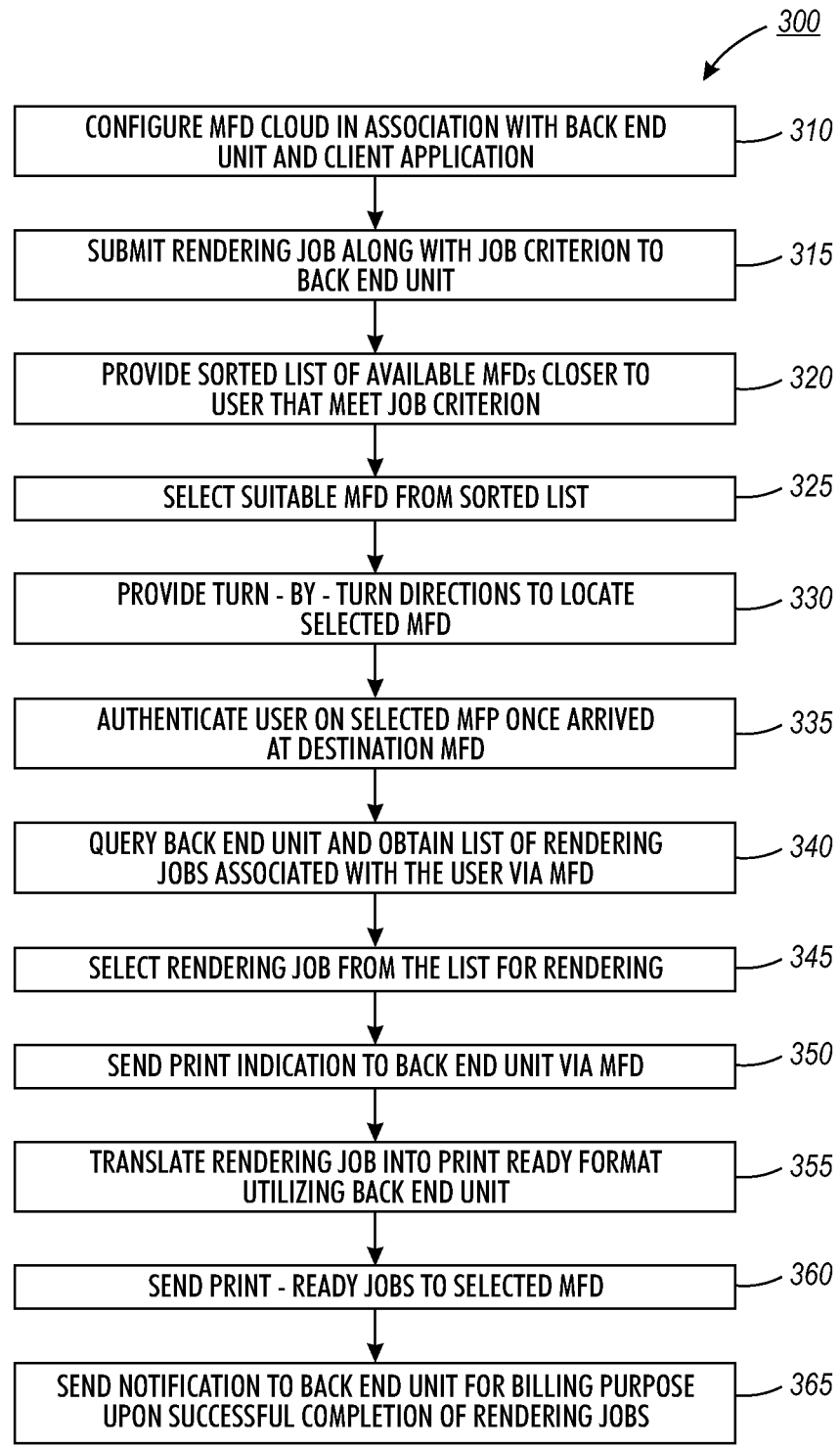
FIG. 3 illustrates a high level flow chart of operation illustrating logical operational steps of a method for matching distributed users with distributed MFDs, in accordance with an embodiment.

FIG. 3 illustrates a high level flow chart of operation illustrating logical operational steps of a method 300 for matching distributed users with distributed MFDs in accordance with an embodiment. The MFD cloud 210 along with the back end unit 250 and the client application 270 can be configured, as illustrated at block 310. The user 290 can submit the rendering job 280 along with the job criterion 275 to the back end unit 250, as depicted at block 315. A sorted list of nearby available MFDs that meet the print criterion 275 can be provided to the user 290, as indicated at block 320. The available MFDs can be provided based on the user job criterion 275 and the latest heartbeat 240 received, which indicates that the MFDs are functioning properly.

Next, as illustrated at block 325, the user 290 can select the MFDs from the sorted list. The user 290 can, thereafter, be provided with turn-by-turn directions to locate the selected MFDs, as depicted at block 330. In an unlikely event (e.g. loses connectivity, misses the heartbeat 240, runs out of toner, and so forth), the system 250 immediately notifies the user 290 and offers to reroute to the next nearest MFD that satisfies the job criterion 275 if the chosen MFD may become unavailable. The user can be authenticated by the MFD if the user 290 reaches the destination MFD, as indicated at block 335.

Thereafter, the back end unit 250 can be queried for a list of rendering jobs 280 along with the job criterion 275 that is to be rendered via the selected MFD, as illustrated at block 340. The user 290 can then select the rendering job 280 from the list of rendering jobs, as depicted at block 345. A print indication can, therefore, be sent to the back end unit 250 via the MFD, as indicated at block 350. The list of selected rendering jobs can be translated into a print ready format via the back end unit 250, as illustrated at block 355. The print-ready jobs can be subsequently sent to the selected MFD, as depicted at block 360. Subsequent to rendering, the MFD may send a notification to the back end unit 250 for billing purposes, as indicated at block 365. Note that the user 290 can send messages to the MFD directly from the MFD or from a client application 270, which can be a personal computer, network computer, or even the mobile device 295.

The method 300 permits the user 290 to specify that the job 280 must be rendered as soon as the job 280 is submitted as opposed to waiting for the user to arrive at the MFD. If a job is submitted by the user 290, it can be translated into a print ready format immediately and added to the print queue 227 for the specific MFD selected by the user 290. The MFD can periodically poll the queue 227 for new jobs, perhaps while sending the regular heartbeat 240 to the back end unit 250. The new jobs can immediately be pulled down to the MFD, rendered, and the user's account billed for the transaction. Such an approach reduces the wait time for users once they arrive at the MFD in the private cloud 235.

Figure 4:
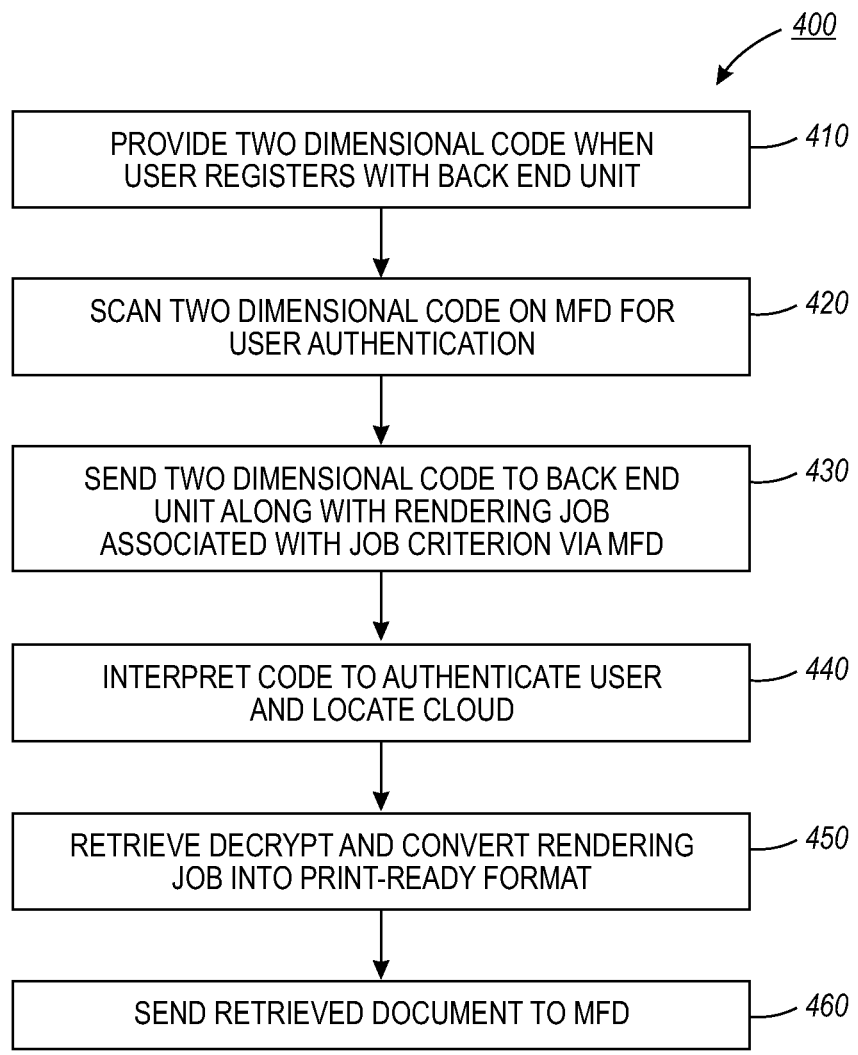
FIG. 4 illustrates a high level flow chart of operation illustrating logical operational steps of a method for providing document security with respect to distributed MFDs, in accordance with an embodiment.

FIG. 4 illustrates a high level flow chart of operation illustrating logical operational steps of a method 400 for providing rendering job security, in accordance with an embodiment. The method 400 can be utilized to provide rendering job security if the jobs are rendered utilizing MFDs 201-203 in the public cloud 250. The user 290 can be allowed to register with the back end unit 250 and can be provided with a two dimensional code, as illustrated at block 410. The two dimensional code can be scanned on the MFD for user authentication, as depicted at block 420. The two dimensional code can be sent to the back end unit 250 along with the rendering job 280 and the job criterion 275 via the MFD, as indicated at block 430. Thereafter, the code can be interpreted and the user 290 can be authenticated, as illustrated at block 440. Next, the rendering job 280 can be retrieved, decrypted, and converted to the print ready format via the back end unit 250, as depicted at block 450. The print-ready documents can be sent to the MFD for printing the rendering jobs 280, as indicated at block 460.

Figure 5:
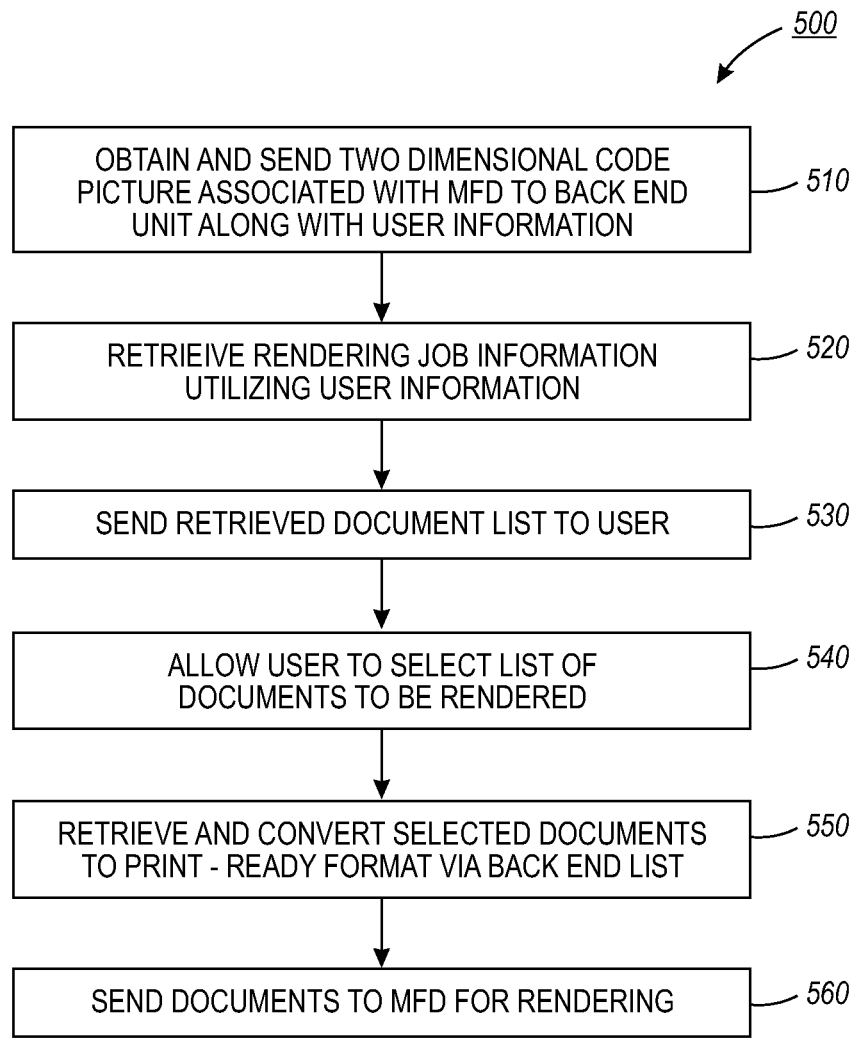
FIG. 5 illustrates a flow chart of operation illustrating logical operational steps of a method for rendering jobs on a non-EIP enabled MFD, in accordance with an embodiment.

FIG. 5 illustrates a flow chart of operation illustrating logical operational steps of a method 500 for rendering jobs on a non-EIP enabled MFD, in accordance with an embodiment. The EIP (Extensible Interface Platform) enabled MFD, for example, can be seamlessly integrated with the back end unit 250. The EIP is a service which permits custom services in a MFD graphical user interface. In some situations, for example, an invoice button associated with the MFD, for example, may be invoked to simultaneously send an invoice to a particular department, wherein the invoice is archived as a part of a document management system for easy retrieval. Such EIP enabled MFDs can transmit user information (which can be obtained after user authenticates at the MFD) to the back end unit 250 and retrieve the rendering jobs locally for print via EIP applications.

The non-EIP enabled MFD can be glued in association with a two-dimensional code. The two-dimensional code contains identifying information represented as a two-dimensional glyph (similar to a UPC code which is a 1-dimensional code). Such a glyph is unreadable to humans, but can be generated or interpreted using a software algorithm. In some situations, a picture of the two-dimensional code may be obtained and sent to the back end unit 250 along with user information, as illustrated at block 510. Note that this may be accomplished, for example, by taking a picture of the code using a camera on a mobile device (e.g., a camera phone) and mailing the photo to the back end unit. The rendering job information can be retrieved by interpreting the two-dimensional code, as depicted at block 520. The two-dimensional code can be interpreted by the back end unit 250 to find the IP address of the MFD encoded therein. The retrieved rendering job list can be sent to the user 290, as indicated at block 530. The user 290 can select a list of documents to be rendered, as illustrated at block 540. The selected rendering job list can be retrieved and converted to the print ready format, as depicted at block 550. The documents can, thereafter, be sent to the MFD via the back end unit 250 for rendering, as indicated at block 560.

It is believed that by utilizing the system and method described herein, the distributed users can be matched with distributed MFDs. The system can direct users immediately to a MFD as soon as a new device is registered with the system. Such an approach permits users to quickly find the closest available MFD based on document processing requirement.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A method for matching distributed users with distributed multi-function devices, said method comprising: registering a plurality of multi-function devices associated with a cloud infrastructure and user information to a back end unit, wherein said back end unit maintains a persistent state of said plurality of multi-function devices in said cloud infrastructure; generating a sorted list of said plurality of multi-function devices that meet at least one job criterion associated with a rendering job and account for user proximity to said plurality of multi-function devices in response to receiving said rendering job from a user; providing a dynamic turn-by-turn direction for locating a destination multi-function device in said cloud infrastructure from a user's location in response to selecting said destination multi-function device from said sorted list wherein said turn-by-turn direction accounts for travel plans and details about preferred locations; updating said dynamic turn-by-turn direction if said destination multi-function device becomes unresponsive, to locate a new destination multi-function device in said cloud infrastructure from a user's location in response to selecting said new destination multi-function device from said sorted list; affixing a picture of a two dimensional code associated with a non-EIP enabled MFD to said non-EIP enabled MFD; sending a picture of said two dimensional code to said back end unit; and interpreting said two dimensional code by said back end unit to find an IP address associated with said non-EIP enabled MFD to render said rendering job to said IP address.

2. The method of claim 1 wherein said cloud infrastructure comprises a public cloud associated with at least one publically accessible MFD.

3. The method of claim 1 wherein said cloud infrastructure comprises a private cloud associated with at least one privately owned MFD.

4. The method of claim 3 further comprising creating a virtual print queue that maintains said rendering job with respect to each user utilizing a storage unit associated with said private cloud and/or said back end unit for confidentially rendering said rendering job.

5. The method of claim 1 further comprising accessing a MFD matching service in order to authenticate said user if said user reaches said destination multi-function device.

6. The method of claim 1 wherein maintaining a persistent state of said plurality of multi-function devices in said cloud infrastructure further comprises:
providing a snapshot associated with said plurality of multi-function devices current availability to said back end unit comprising an up status, a down status, a jammed status, an out of toner status, and an out of paper status; and
verifying if said plurality of multi-function devices are connected to said cloud infrastructure every five minutes.

7. The method of claim 1 further comprising generating account information with respect to an owner of said destination multi-function device to manage billing with respect to said destination multi-function device.

8. The method of claim 1 further comprising:
querying said back end unit for a list of rendering job associated with said user and selecting said rendering job from said list; and translating said rendering to a print ready format in response to receiving a print indication from said destination multifunction device.

9. The method of claim 1 further comprising: sending a notification to said back end unit for billing said rendering job upon completion of said rendering job.

10. The method of claim 1 further comprising: sending user information to said back end unit and retrieving said rendering job locally for rendering via an EIP enabled MFD.

11. A system for matching distributed users with distributed multi-function devices, said system comprising: a processor; a data bus coupled to said processor; and a computer-usable medium embodying computer code, said computer-usable medium being coupled to said data bus, said computer program code comprising instructions executable by said processor and configured for: registering a plurality of multi-function devices associated with a cloud infrastructure and user information to a back end unit, wherein said back end unit maintains a persistent state of said plurality of multi-function devices in said cloud infrastructure; generating a sorted list of said plurality of multi-function devices that meet at least one job criterion associated with a rendering job and account for user proximity to said plurality of multi-function devices in response to receiving said rendering job from a user; providing dynamic a turn-by-turn direction for locating a destination multi-function device in said cloud infrastructure from a user's location in response to selecting said destination multi-function device from said sorted list wherein said turn-by-turn direction accounts for travel plans and details about preferred locations; updating said dynamic turn-by-turn direction if said destination multi-function device becomes unresponsive, to locate a new destination multi-function device in said cloud infrastructure from a user's location in response to selecting said new destination multi-function device from said sorted list; affixing a picture of a two dimensional code associated with a non-EIP enabled MFD to said non-EIP enabled MFD; sending a picture of said two dimensional code to said back end unit; and interpreting said two dimensional code by said back end unit to find an IP address associated with said non-EIP enabled MFD to render said rendering lob to said IP address.

12. The system of claim 11 wherein said cloud infrastructure comprises a public cloud associated with at least one publically accessible MFD.

13. The system of claim 11 wherein said cloud infrastructure comprises a private cloud associated with at least one privately owned MFD.

14. The system of claim 13 wherein said instructions are further configured for creating a virtual print queue that maintains said rendering job with respect to each user utilizing a storage unit associated with said private cloud and/or said back end unit for confidentially rendering said rendering job.

15. The system of claim 11 wherein said instructions are further configured for accessing a MFD matching service in order to authenticate said user if said user reaches said destination multi-function device.

16. A system for matching distributed users with distributed multi-function devices, said system comprising: a processor; a data bus coupled to said processor; and a computer-usable medium embodying computer code, said computer-usable medium being coupled to said data bus, said computer program code comprising instructions executable by said processor and configured for: registering a plurality of multi-function devices associated with a cloud infrastructure and user information to a back end unit, wherein said back end unit maintains a persistent state of said plurality of multi-function devices in said cloud infrastructure; generating a sorted list of said plurality of multi-function devices that meet at least one job criterion associated with a rendering job and account for user proximity to said plurality of multi-function devices in response to receiving said rendering job from a user; providing dynamic a turn-by-turn direction for locating a destination multi-function device in said cloud infrastructure from a user's location in response to selecting said destination multi-function device from said sorted list wherein said turn-by-turn direction accounts for travel plans and details about preferred locations; updating said dynamic turn-by-turn direction if said destination multi-function device becomes unresponsive, to locate a new destination multi-function device in said cloud infrastructure from a user's location in response to selecting said new destination multi-function device from said sorted list; and creating a virtual print queue that maintains said rendering job with respect to each user utilizing a storage unit associated with said private cloud and/or said back end unit for confidentially rendering said rendering job; a picture of a two dimensional code affixed to an associated non-EIP enabled MFD, wherein said computer program code comprising instructions executable by said processor are further configured for: sending a picture of said two dimensional code to said back end unit; and interpreting said two dimensional code by said back end unit to find an IP address associated with said non-EIP enabled MFD to render said rendering job to said IP address.

17. The system of claim 16 wherein maintaining a persistent state of said plurality of multi-function devices in said cloud infrastructure further comprises:
providing a snapshot associated with said plurality of multi-function devices current availability to said back end unit comprising an up status, a down status, a jammed status, an out of toner status, and an out of paper status; and
verifying if said plurality of multi-function devices are connected to said cloud infrastructure every five minutes.

18. The system of claim 16 wherein said instructions are further configured for generating account information with respect to an owner of said destination multi-function device to manage billing with respect to said destination multi-function device.

19. The system of claim 16 wherein said instructions are further configured for:
querying said back end unit for a list of rendering job associated with said user, selecting said rendering job from said list; and
translating said rendering to a print ready format in response to receiving a print indication from said destination multifunction device.

* * * * *